No. 721,868. PATENTED MAR. 3, 1903.
C. DROHOVITH.
BOAT.
APPLICATION FILED NOV. 28, 1902.
NO MODEL.
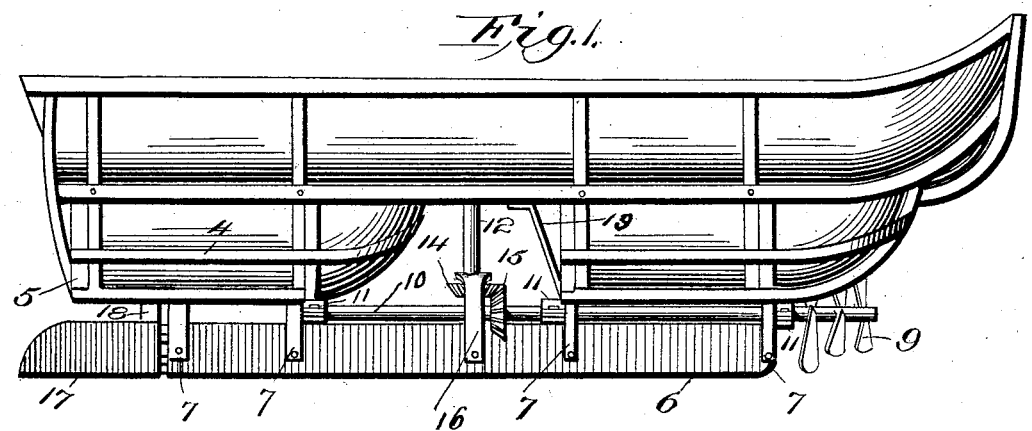
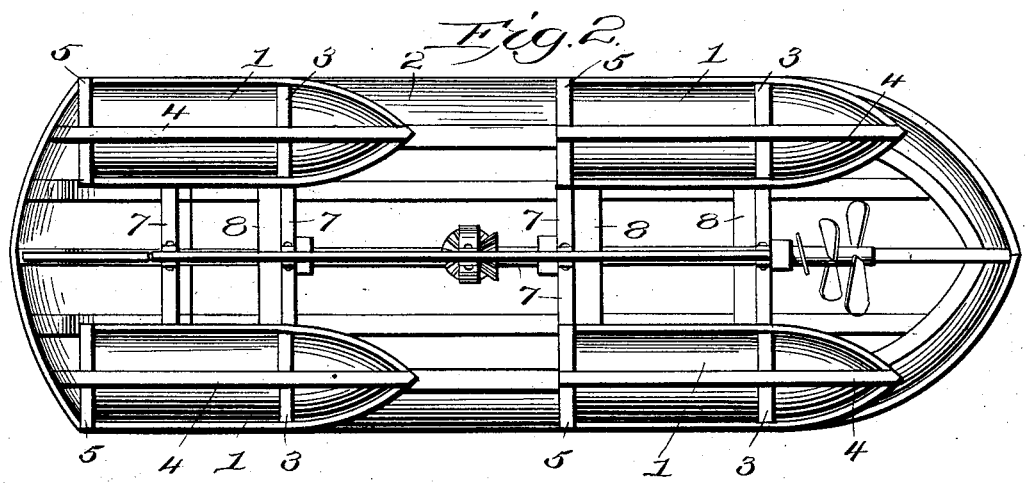

UNITED STATES PATENT OFFICE.

CLEMENS DROHOVITH, OF WEST SUPERIOR, WISCONSIN.

BOAT.

SPECIFICATION forming part of Letters Patent No. 721,868, dated March 3, 1903.

Application filed November 28, 1902. Serial No. 133,159. (No model.)

*To all whom it may concern:*

Be it known that I, CLEMENS DROHOVITH, a citizen of the United States, residing at West Superior, in the county of Douglas and State of Wisconsin, have invented certain new and useful Improvements in Boats, of which the following is a specification, reference being had therein to the accompanying drawings.

This invention relates to certain new and useful improvements in boats and the like, and broadly has for its object a device of this type wherein the hull of the boat may be supported through the medium of floats, which latter lie within the water and support the hull above the surface of the water, thereby offering less opposition to the passage of the boats.

With the above and other objects in view my invention further consists in the novel details of construction and combination of parts to be clearly described in the following specification and then set forth in the claims.

Referring to the accompanying drawings, forming a part of this application, and wherein like characters of reference indicate similar parts throughout the several views, Figure 1 is a side elevation of a boat, illustrating my improvements; and Fig. 2 is a bottom plan view thereof, the boat being inverted.

The hull of the boat is formed of the usual framework and, as shown, is not provided with the usual side planking or veneering. In order to carry out the object of the invention, I provide a series of floats or pontoons 1, of substantially cigar shape, these floats or pontoons being preferably made of some light material, such as aluminium, and of course being made perfectly air-tight. These floats 1 are preferably arranged fore and aft, two being positioned fore and two aft, adjacent the sides of the boat 2. In order to offer protection to the float and further to efficiently secure same to the bottom of the hull, I provide a series of bands 3, which engage about the float and are secured by their ends to the hull. Running transversely to this band and longitudinally with relation to the floats I provide braces 4, which braces extend on the bottom and on each side of the float, the side braces at their forward ends being secured to the bottom longitudinal braces, which latter extend upwardly and are connected to the bottom of the hull. At the rear end of each of the floats is arranged a backing or brace 5, to which is connected the longitudinal braces, this backing serving to protect the rear end of the float and more firmly secure the latter in its position.

A keel 6 is suspended from the bottom of the hull through the medium of a series of braces 7, which at their lower ends are connected to the keel and at their upper ends are firmly secured to the hull of the boat, this hull being provided with slats 8, against the sides of which the braces 7 may be secured in any approved manner. This keel extends below the floats and terminates abruptly fore and aft of the hull for the purposes to be hereinafter described. The propeller 9 is arranged upon a longitudinally-extending shaft 10, supported in bearings 11, suitably secured on the upper side of the keel, these sleeves being suitably spaced and may be secured in any approved fashion. A vertically-arranged shaft 12 extends through the bottom of the hull and up through the body of the boat and at its lower end is provided with a beveled keel-wheel 14, which meshes with the corresponding wheel 15, keyed to the propeller-shaft 10. A bearing 16 straddles the keel and is suitably secured thereto, this bearing at its top portion receiving the shaft 12. Suitably pivoted to the rear end of the keel is the rudder 17, actuated through the medium of a rod 18, the latter of course extending upwardly into the boat, whereby the same may be conveniently operated. The propeller 9 is arranged near the forward end of the boat and extends beyond the keel. It will thus be observed that this propeller being arranged near the front of and between the floats the water displaced by the propeller will be thrown against the sides of the floats, to the rear of the front portions thereof, thereby offering less opposition to the speed of the boat through the water. A brace 19 may be provided, which is secured to the backing of the floats and to the bottom of the hull, and thereby serves to more firmly secure these backings. The bracings or backings 5 are separate from the floats and, as will be apparent, prevent any rearward movement of the floats.

Various minor details in construction and combination of parts may be resorted to without departing from the general spirit and scope of my invention.

Of course it will be understood that the framework illustrated in the accompanying drawings is to be covered by the usual planking or veneering, though this has been omitted from the drawings in order to clearly illustrate the structure of the framework.

Having fully described my invention, what I claim as new, and desire to secure by Letters Patent, is—

1. A boat of the type set forth, provided with a series of floats suitably secured fore and aft of the boat and adjacent to each of the sides thereof, a keel extending below the floats, with braces secured to the keel and to the bottom of the boat, a propeller-shaft carrying a propeller suitably journaled on the upper side of the keel, a cog-wheel carried by the propeller-shaft, a vertically-arranged shaft carrying a cog-wheel on its lower end meshing with said first-named cog-wheel, and a bearing secured to the keel and engaging said last-named shaft, substantially as described.

2. A boat of the type set forth, provided with floats arranged fore and aft of the boat and arranged adjacent to each of the sides thereof, backings for the floats, braces arranged longitudinally and transverse of the floats, a keel supported below the floats, a propeller-shaft carrying a propeller on the keel, and means for driving said shaft, substantially as described.

In testimony whereof I affix my signature in the presence of two witnesses.

CLEMENS DROHOVITH.

Witnesses:
T. L. McINTOSH,
J. W. WINGATE.